March 31, 1931.  W. OWEN  1,798,625
APPARATUS FOR TRIMMING GLASS SHEETS
Filed May 16, 1927  7 Sheets-Sheet 1

FIG 1

INVENTOR

March 31, 1931. W. OWEN 1,798,625
APPARATUS FOR TRIMMING GLASS SHEETS
Filed May 16, 1927 7 Sheets-Sheet 2

INVENTOR

March 31, 1931.  W. OWEN  1,798,625
APPARATUS FOR TRIMMING GLASS SHEETS
Filed May 16, 1927    7 Sheets-Sheet 5

INVENTOR

March 31, 1931.  W. OWEN  1,798,625
APPARATUS FOR TRIMMING GLASS SHEETS
Filed May 16, 1927  7 Sheets-Sheet 6

INVENTOR

Patented Mar. 31, 1931

1,798,625

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

APPARATUS FOR TRIMMING GLASS SHEETS

Application filed May 16, 1927. Serial No. 191,691.

The invention relates to apparatus for trimming off the waste glass along the side edges of glass sheets. It is particularly applicable to this service as applied at the outlet end of a leer from which the glass emerges in a continuous sheet or in a series of relatively long sheets in which the device is power driven, but is also useful in connection with a hand trimming operation. In both operations, one of the cross members connecting the two side cutter frames may be utilized as a straight edge, so that the sheet whose side edges are being trimmed, may also be cut transversely to give sections of the desired length. The invention has for its objects the provision of a simple, reliable construction; (1) which is easily applicable to the leer outlet and requires little overhead space in which to operate; (2) which will operate positively to cut the glass; (3) which will adapt itself to the sheet being cut and which will always cut at a uniform distance from the edge of the sheet, such distance being subject to variation to meet requirements; (4) in which the shifting of the apparatus from one sheet to the next is provided for, the cutting movement of the frame being automatically discontinued when the cutters reach the rear end of each sheet; (5) and in which provision is made for automatically cracking off the edges of the glass by the forward movement of the sheet after the scoring operation. Certain embodiments of the invention are illustrated in the accompanying drawings, wherein:

Figure 1:
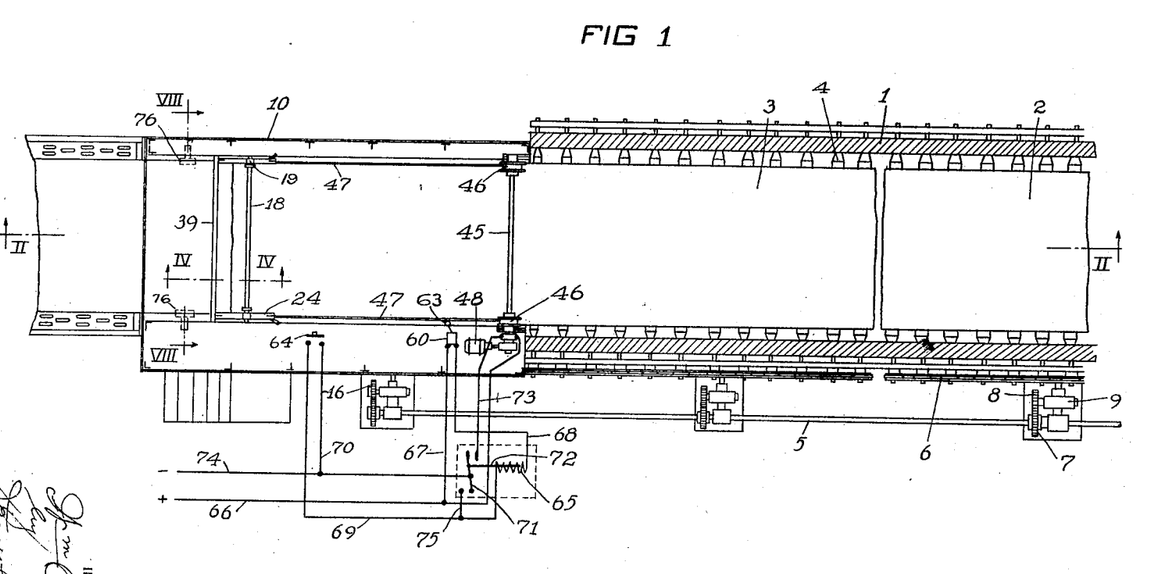
Figure 1 illustrates diagrammatically in plan the outlet end of a leer equipped with the improved apparatus.
Figure 2:
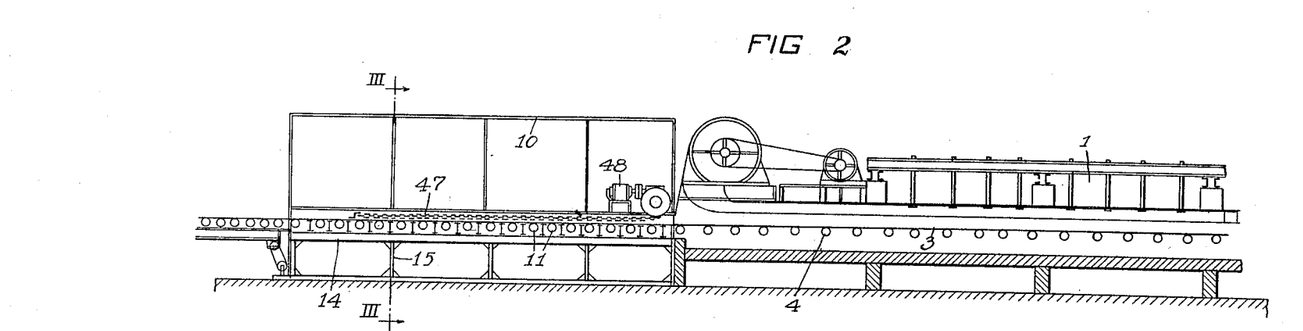
Fig. 2 is a section on the line II—II of Fig. 1.
Figure 3:
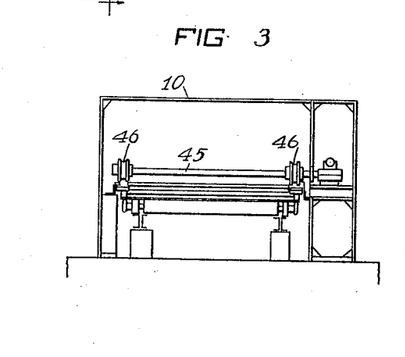
Fig. 3 is a transverse section on the line III—III of Fig. 2.

Referring to the general arrangement as shown in Figs. 1, 2 and 3, 1 is the outlet end of a leer through which the sheets of glass 2, 3, etc. are being carried upon the rollers 4, such rollers being driven in any desired manner so that the glass is continuously moved forward, emerging from the leer sufficiently cool to be cut and handled. As shown, the rollers 4 are driven from the line shaft 5 through the intermediary of suitable reduction gearing and the chains 6 passing around sprockets on the ends of the rolls. The drive from the line shaft 5 to the rolls is accomplished by means of suitable reduction gearing, including the spur gears 7 and 8 and worm gearing in the casings 9. At the outlet end of the leer is on inspection shed 10, through which the glass passes, and it is in the course of its travel through this shed that the trimming of the edges occurs. In its passage through the shed, the glass is supported upon rolls similar to those in the leer and upon the transverse plates 12 (Fig. 4) carried by the I-beams 13. The I-beams are secured at their ends to suitable channels 14 extending longitudinally of the inspection shed and supported upon suitable standards 15 (Fig. 2). The rollers 11 are driven from the line shaft 5 in the same manner as the rolls 4, this being accomplished through the intermediary of the gearing 16, from which a sprocket chain is driven passing around the sprockets 17 on the ends of the roll axles.

Figure 4:
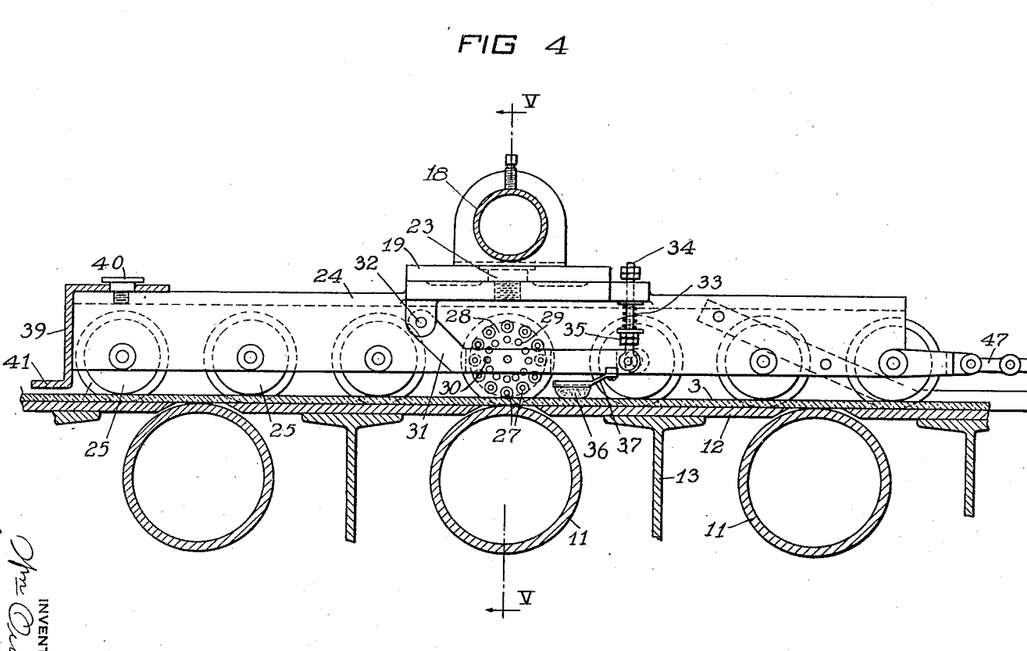
Fig. 4 is a section on an enlarged scale on the line IV—IV of Fig. 1.
Figure 5:
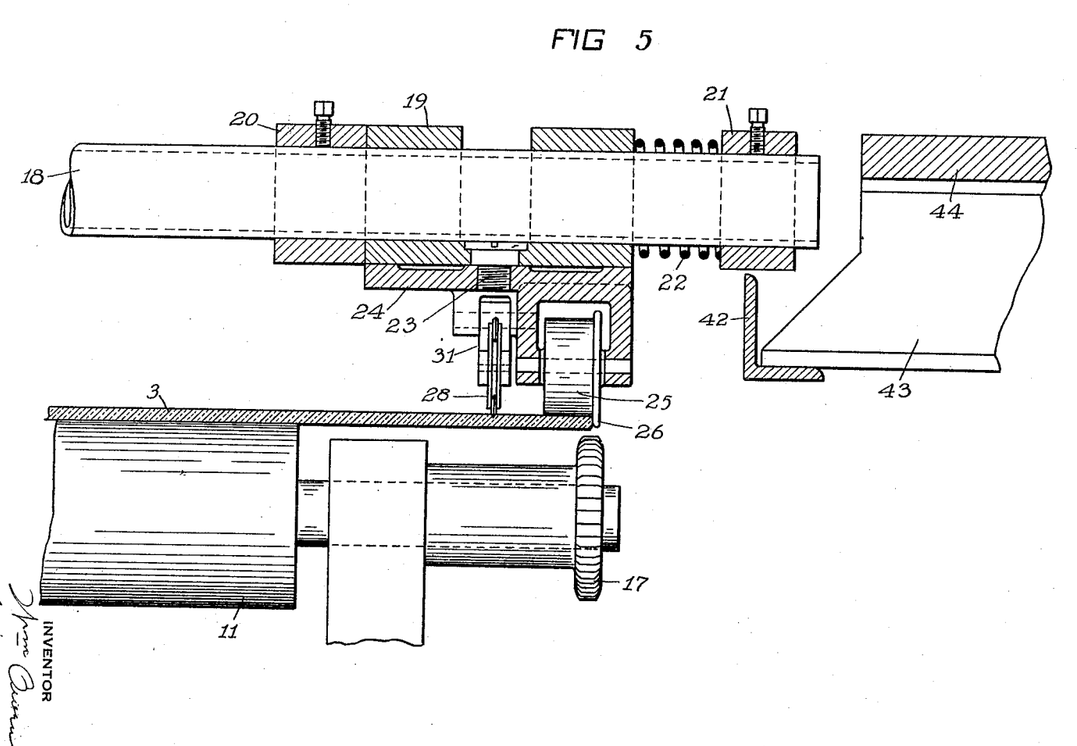
Fig. 5 is a section on the line V—V of Fig. 4.

The apparatus for trimming off the edges of the sheet is mounted to ride upon the glass itself, as will be seen by reference to Figs. 4 and 5 in connection with Fig. 1. This apparatus comprises a tie member in the form of the pipe 18, extending transversely of the table, and having secured to its ends, the castings 19, 19. These castings are held against longitudinal movement on the pipe by means of the pairs of collars 20 and 21, the collars 20 being clamped to the pipe on the inner sides of the castings, while the collars 21 are clamped to the pipe on the outer side of such castings. Between the outer sides of the castings and the collars 21 are the springs 22 for pressing the members 19 yieldingly inward. Swiveled to the members 19, 19 by the pivot members 23, 23 are the shoes 24, 24, preferably in the form of steel castings in which are journaled the seven wheels 25, 25, etc. These wheels rest upon the upper surface of the glass sheet 3, as indicated in Fig. 4 and are provided with flanges 26 engaging the side edges of the glass. The engagement between the flanges 26 and the side edges of the sheet is a yielding one due to the springs 22, so that the device will adapt itself to the sheet in case there is a slight variation in the width of the sheet. When the apparatus is used upon sheets which are of absolutely uniform width, the use of springs, such as the springs 22 is not required.

Each of the shoes 24 carries a glass scoring or cutting device. This may be of any desired form, but as shown, the cutting is accomplished by any one of the discs 27 carried by the wheel 28. The wheel has index holes 29 corresponding in position to those of the discs and the wheel is located in position by means of an index pin 30, which extends through the walls of the bracket 31 and through one of the holes 29. This permits of a ready change of cutting discs when the one in service becomes dulled through use. The cutter wheel is mounted in a bracket 31, pivoted to the shoe 24 at 32 and having its rear end yieldingly pressed downward by the spring 33 mounted on the rod 34. The tension of the spring may be adjusted by means of the nut 35, so that any desired pressure of the cutting disc upon the glass may be secured. The bracket 31 is also shown as provided with a cloth swab 36 engaging the glass and supported upon the cup-like member 37. This cup-like member is provided with suitable perforations and is supplied with turpentine from time to time so as to wet the surface of the glass in advance of the cutter wheel and so promote the cutting effect of the disc.

Extending transversely of the two shoes at their forward ends is the straight edge 39 secured by means of the screw members 40. The lower flange 41 of this member lies relatively close to the glass, and may be used as a guide for a scoring or cutting tool in severing the glass sheet transversely of its length. Because of the guiding of the shoes from the edges of the glass, such shoes are substantially parallel to the center line of the glass, so that the straight edge always lies substantially at right angles to the longitudinal center line of the glass sheet. In order that the cutting apparatus, including the shoes 24 may not drop downward in case the device runs off of the glass at the end of a sheet, the angle irons 42 are provided extending longitudinally of the table at each side and lying beneath the ends of the pipe 18 so that the frame can drop only a slight distance in case the wheels 25 reach a point where they are not supported by the glass. The angles 42 are supported by suitable brackets 43 carried by the inspection shed floor 44.

Figure 7:
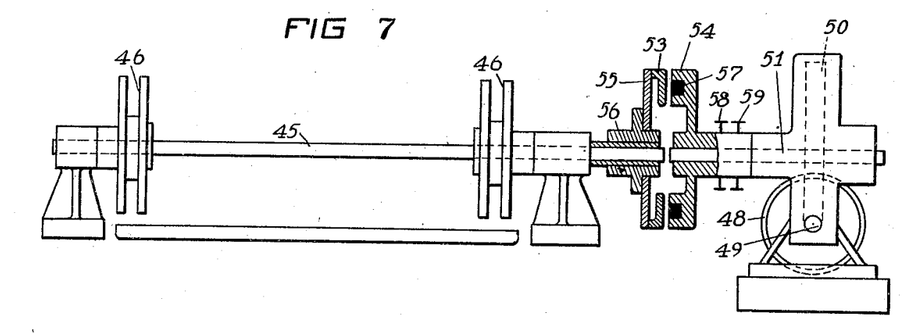
Fig. 7 is a detail view in front elevation of the apparatus for moving the cutter frame.

The cutting operation is started at the forward end of the sheet 3, which has emerged from the leer, the frame being pulled to the right (Fig. 1) at a rate of speed which will give the best scoring or cutting. The means for securing this movement include the transverse shaft 45 having at each end a drum 46, to which the ends of the chains 47 are attached, such chains being secured at their other ends to the shoes 24, 24, as indicated in Fig. 4. The shaft 45 is driven from the motor 48, whose shaft 49 (Fig. 7) is provided with a worm which drives the worm wheel 50 on the shaft 51. The ends of the shaft 51, and 45 are releasably clamped together by means of a magnetic clutch, including the opposing ring members 53 and 54, the member 53 being carried by a spring plate 55 secured to the hub 56 keyed to the shaft 45. The member 54 is provided with the coils or windings 57 and has its hub keyed to the shaft 51, such hub being provided with the brush rings 58 and 59, which are insulated from each other and to which the wires from the coils are connected. The shaft 51 is driven continuously forward from the motor 48 and when the coils 57 are energized, the ring 53 is clamped to the ring 54 and the shaft 45 rotated, thus dragging the cutter frame to the rear and severing the glass along its side edges. When the circuit through the coils 57 are interrupted, the member 53 is released and the rotation of the shaft 45 stops. The cutter member now rests upon the glass, which is moving to the left and this movement is allowed to continue until the cutter frame arrives at its original position at the left hand end of the inspection shed. The operation, as above described, may now be repeated to cut another length of glass, starting at the point where the previous cut terminated, as above indicated, by energizing the magnet clutch to again secure the rotation of the shaft 45 and the drums 46, 46 to carry the cutter frame to the right.

Figure 6:
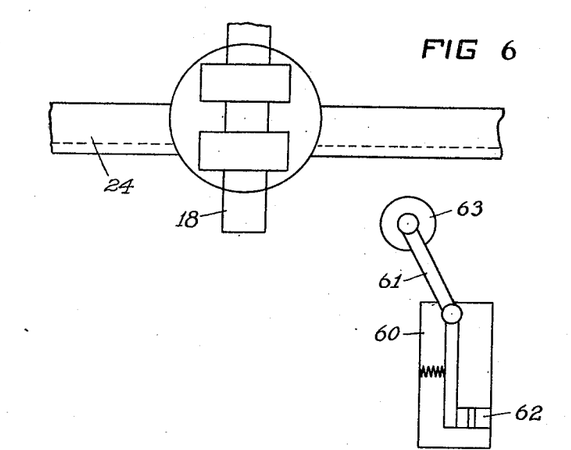
Fig. 6 is an enlarged detail showing the relation of the limit switch to the cutter frame.

The apparatus is preferably arranged so that the cutting movement of the frame and its return to starting position requires very little attention on the part of one of the inspectors located in the inspection shed. This is accomplished by merely pressing and then releasing a push button. The pressing of the push button causes the closing of a relay, completing a circuit through the magnetic clutch. The relay is arranged so that it remains closed after the push button is released and stays closed until the cutter frame arrives at the point where it is desired that its movement should terminate, at which time, it engages a limit switch, thus interrupting the flow of current through the relay coil so that the relay opens, thus cutting off the current to the magnetic clutch. The frame then rides back to starting position on the glass as heretofore described. The circuit whereby this operation is carried out will be seen by reference to Fig. 1 in connection with Fig. 6, the latter figure showing the limit switch 60. This switch comprises a swinging arm 61 having one end pressed into engagement with the contact 62 and its other end provided with a roller 63 adapted to be engaged by the end of the tie member 18 when the cutter frame reaches the end of its travel. When the push button 64 is closed, current is supplied through the coil 65 of the relay via the wires 66, 67, 68, 69 and 70, so that the arm 71 is closed against the tension of a suitable spring by means of the solenoid bar 72, which is pulled into the coil 65. The closing of the arm 71 supplies current to the windings of the magnetic clutch via the lines 66, 73 and 74, so that the shaft 45 is rotated and the cutter frame is pulled rapidly to the right. This movement continues until the end of the bar 18 strikes the roller 63 of the limit switch 60 and opens such switch, thus interrupting the circuit, which up until this time has been continued through the coil 65 via the lines 66, 67, 68, 75 and 74. This circuit being interrupted, the arm 71 opens, thus interrupting the circuit through the magnetic clutch, so that the shaft 45 no longer rotates. The movement of the cutter frame is thus stopped and as such frame is supported only upon the glass sheet, it is carried to the left by such glass sheet until it reaches its starting position, at which time the operator again presses the button 64 to secure a repetition of the cutting operation. The apparatus may be applied either to a continuous sheet or to sheets which are separated, such as the sheets 2 and 3, as indicated in Fig. 1. In the case of separated sheets of this kind, the leer is preferably operated so as to bring the two ends of the sheets relatively close together so that in the operation of the apparatus, the shoes 24 will bridge the space between two succeeding sheets. The shoes 24 are, therefore, made relatively long so that they will bridge a considerable space.

Figures 8, 10, 11, 12:
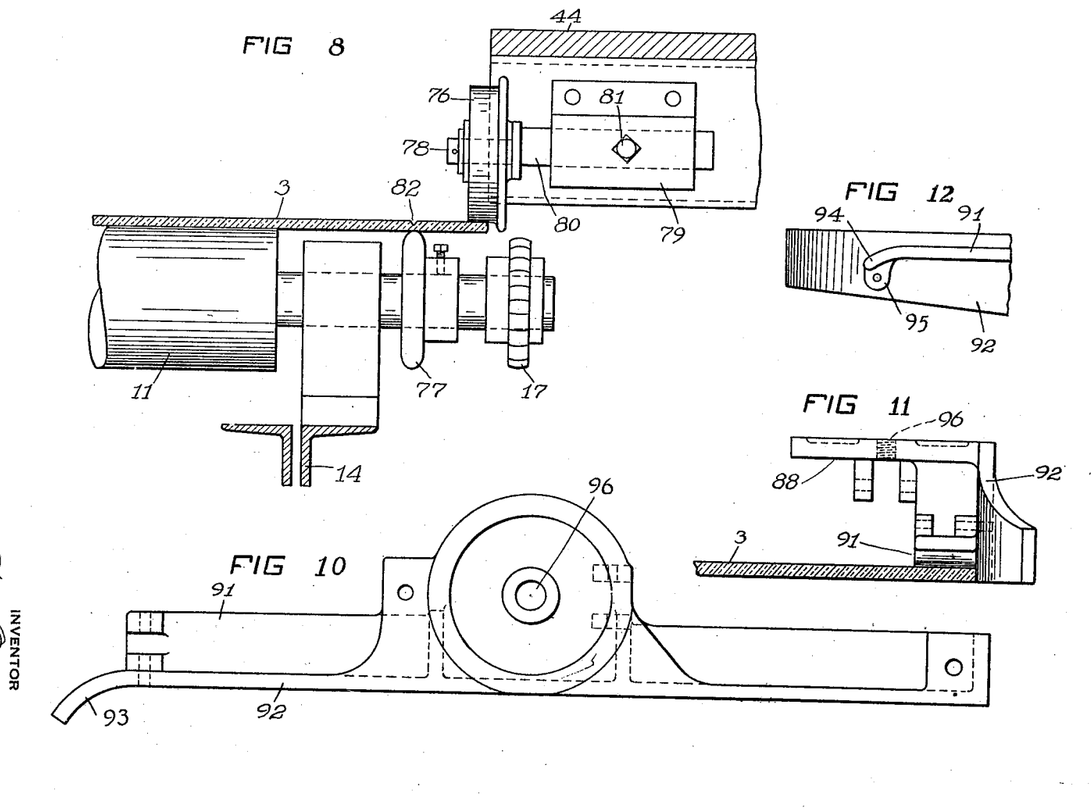
Fig. 8 is an enlarged section on the line VIII—VIII of Fig. 1.
Figs. 10, 11 and 12 are detail views of certain of the parts shown in Fig. 9.

In order to provide for cracking off the edges of the sheets after they have been scored, the construction shown in Fig. 8 is preferably employed, such construction including a pair of rollers 76 and 77 engaging the sheet on opposite sides and applying a bending tension tending to crack the glass. This device is preferably located just to the left of the starting point of the cutter frame, as indicated in Fig. 1, the wheel 77 being secured to the axle of one of the rolls 11 of the trimming table, while the wheel 76 is carried on an axle 78 secured in a bearing 79 attached to the inspection shed floor 44. The axle 78 which carries the wheel 76 has its right hand end 80 eccentrically disposed so that by rotating this part 80, the wheel 76 may be adjusted up and down to vary the pressure exerted by such wheel upon the edge of the glass sheet 3. The part 80 is clamped in any desired position of adjustment by means of the screw 81. The wheel 77 is preferably disposed immediately below the line of scoring, indicated by the numeral 82, although it need not be in exact vertical alinement therewith, so that only a slight amount of pressure is required to cause the glass to crack along the line 82, and this cracking will be continued as the glass moves forward, so that the entire side edge of the sheet is removed without any attention on the part of the operator. The wheel 77 is preferably located so that its periphery lies slightly above the periphery of the roll 11, thus insuring a pressure on the lower side of the glass opposite the score line, even though the sheet should not be perfectly flat throughout its length.

Figure 9:
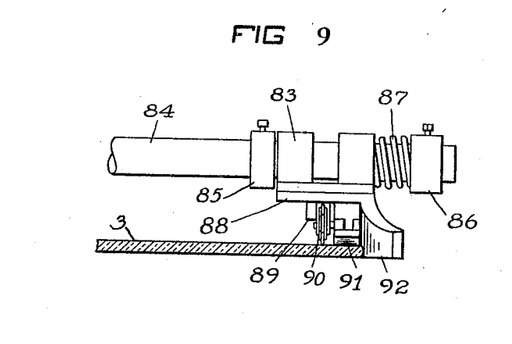
Fig. 9 is a fragmentary view showing a modification.

Figs. 9, 10, 11 and 12 illustrate a modification in which the wheels 25 of the Fig. 4 construction are omitted and a shoe substituted therefor, which rests upon the surface of the glass and has a flange projecting down along the side edge of the sheet. As indicated in Fig. 9, the casting 83 is mounted upon the tie bar 84 between the collars 85 and 86, a spring 87 being employed for pressing the member 83 to the left. Swivelled to the member 83 is the shoe 88, upon which is mounted a member 89 carrying the cutter wheel 90 as in the other type of construction. The shoe has a horizontal flange 91 which rests upon the top surface of the glass and a vertical flange 92, which projects down along the side edge of the glass. Fig. 10 shows the shoe in plan, and as there indicated, the forward end 93 of the vertical flange is flared outwardly to guide the shoe as it moves on to another sheet of glass. Also, as indicated in Fig. 12, the horizontal flange 91 is turned up at its end 94; at which point an eye 95 is provided for the attachment of one of the chains, corresponding to the chains 47 of Fig. 4. The shoe is preferably swivelled to the casting 83 by means of a vertical pivot passing through the opening 96 as in the other form of construction. This form of shoe is simpler than that of Fig. 4 and is more positively guided along the side edge of the glass than is the shoe of Fig. 4, but requires a greater amount of force to drag it along the sheet.

Figure 13:
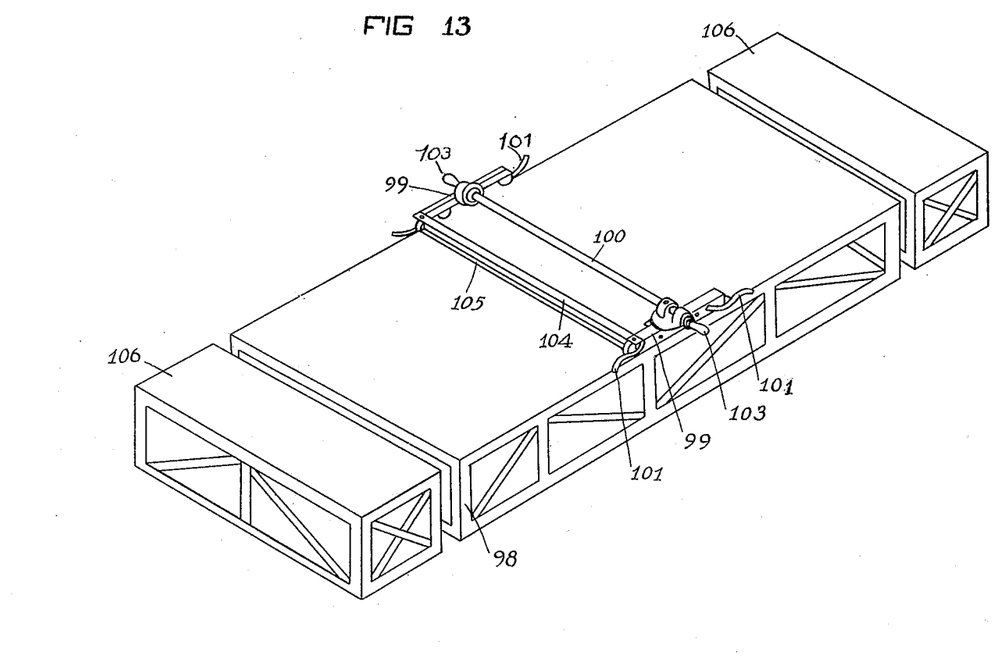
Fig. 13 is a perspective view showing the application of the invention to use in connection with a hand trimmer.

Fig. 13 illustrates a modification heretofore referred to, wherein the invention is applied to the trimming of glass sheets by hand. This device comprises a pair of shoes 99, 99 connected by the tie bar 100 and riding upon the top surface of the glass adjacent the edges thereof. Flange members 101, 101 project down from the shoe and engage the side edges of the glass as in the other type of construction. The extended ends of the bar 100 are provided with the handles 103, 103, and by means of these handles, the frame can be moved easily along the top of the table, the underside of the shoes being provided with cutters for scoring the glass corresponding to those in the structures heretofore described or consisting merely of a single cutter wheel or a diamond point. The forward ends of the shoes 99, 99 are connected by means of a straight edge 104, whose lower edge is flanged, as indicated at 105 and lies relatively close to the surface of the glass so as to form a convenient guide for a scoring tool when it is desired to cut the sheet transversely into two or more sections. As indicated in Fig. 13, short supplemental tables 106, 106 are provided adjacent the ends of the table 98 for receiving the cutter frame when it is desired to place a new sheet of glass upon the cutting table.

What I claim is:

1. In combination in apparatus for trimming off the side edges of a glass sheet, a frame supported on the glass transversely thereof for movement longitudinally thereof, guide members on the frame engaging the side edges of the sheet, a glass cutter carried at each end of the frame, and means for maintaining the glass cutters in predetermined relation to the guide members so that the scoring of the glass by the cutters parallels said side edges of the glass.

2. In combination in apparatus for trimming off the side edges of a glass sheet, a frame supported on the glass transversely thereof for movement longitudinally thereof, guide members on the frame engaging the side edges of the sheet, glass cutters carried at each end of the frame, and means for maintaining the glass cutters in substantially fixed relation with respect to said guide members, and means for maintaining the frame at substantially right angles to the center line of the glass sheet.

3. In combination in apparatus for trimming off the side edges of a glass sheet, a frame supported on the glass transversely thereof for movement longitudinally thereof, guide members on the frame engaging the side edges of the sheet, a glass cutter carried at each end of the frame, and means for maintaining the glass cutters in predetermined relation to the guide members so that the scoring of the glass by the cutters parallels said side edges of the glass, said frame having a straight edge extending at right angles to the center line of the sheet adjacent the surface of the glass and acting as a guide for scoring the sheet transversely.

4. In combination in apparatus for trimming off the side edges of a glass sheet, a frame supported on the glass transversely thereof for movement longitudinally thereof, guide members on the frame engaging the side edges of the sheet, means for yieldingly pressing the guide members inwardly, and a glass cutter carried by each of said members.

5. In combination with means for moving a glass sheet continuously forward, edge trimming means comprising a frame extending transversely of the line of movement of the glass and supported on the glass, a cutter carried at each end of the frame, and power means for moving the frame along the glass in a direction opposite to the direction in which the glass is moving.

6. In combination with means for moving a glass sheet continuously forward, edge trimming means comprising a frame extending transversely of the line of movement of the glass and supported on the glass, a cutter carried at each end of the frame, power means for moving the frame along the glass in a direction opposite to the direction in which the glass is moving, and automatic means for releasing the power means after the frame has moved a predetermined distance, so that the forwardly moving glass is permitted to carry the frame back to starting position.

7. In combination with means for moving a glass sheet continuously forward, edge trimming means comprising a frame extending transversely of the line of movement of the glass and supported on the glass, guide members at the ends of the frame engaging the side edges of the glass sheet, a cutter carried by each of said members, and power means for moving the frame along the glass in a direction opposite to the direction in which the glass is moving.

8. In combination with means for moving a glass sheet continuously forward, edge trimming means comprising a frame extending transversely of the line of movement of the glass and supported on the glass, guide members at the ends of the frame engaging the side edges of the glass sheet, a cutter carried by each of said members, power means for moving the frame along the glass in a direction opposite to the direction of movement of the glass, and automatic means for releasing the power means after the frame has moved a predetermined distance, so that the forwardly moving glass is permitted to carry the frame back to starting position.

9. In combination with means for moving a glass sheet continuously forward, edge trimming means comprising a frame extending transversely of the line of movement of the glass and supported on the glass, a cutter carried at each end of the frame, power means for moving the frame along the glass in a direction opposite to the direction in which the glass is moving, said power means including a continuously operating electric motor and a magnetic clutch, and automatic means operated by the movement of the frame for releasing the clutch after the frame has moved a predetermined distance, so that the forwardly moving glass is permitted to carry the frame back to starting position after the release of the clutch.

10. In combination with means for moving a glass sheet continuously forward, edge trimming means comprising a frame extending transversely of the line of movement of the glass and supported on the glass, a cutter carried at each end of the frame, power means for moving the frame along the glass in a direction opposite to the direction in which the glass is moving, said power means including a continuously operating electric motor, a shaft and a pulley to which the frame is connected, a magnetic clutch intermediate the shaft and pulley, an electric circuit for energizing the clutch, a relay in said circuit, an operating coil having a circuit for energizing said coil and closing the relay, a manually operable means for making and breaking said last circuit, and a switch operated by the movement of the frame for also interrupting said last circuit, the relay being arranged so that when closed, a circuit is completed through the relay coil which is independent of said manually operated means.

11. In combination with means for moving a glass sheet continuously forward, means for scoring the sheet longitudinally adjacent its side edge and means for applying pressure to crack off the scored edge comprising a supporting means for the glass located beneath the glass adjacent the line of scoring, and presser means located above the glass outward from said supporting means and arranged to exert pressure continuously downward upon the edge of the sheet, said supporting and presser means being located in the path of movement of the scored sheet.

12. In combination with means for moving a glass sheet continuously forward, means for scoring the sheet longitudinally adjacent its side edge and means for applying pressure to crack off the scored edge comprising a roller lying beneath the glass adjacent the line of scoring, and a second roller located above the glass outward from said first roller and arranged to exert pressure downwardly upon the edge of the sheet, said rollers being located in the path of movement of the score sheet.

13. In combination with means for moving a glass sheet continuously forward, means for scoring the sheet longitudinally adjacent its side edge and means for applying pressure to crack off the scored edge comprising a supporting means for the glass located beneath the glass adjacent the line of scoring and presser means located above the glass outward from said supporting means and arranged to exert pressure continuously downward upon the edge of the sheet, one of said means being adjustable vertically in order to regulate the pressure tending to crack off the edge of the sheet, said supporting and presser means being located in the path of movement of the scored sheet.

14. In combination with means for moving a glass sheet continuously forward, means for scoring the sheet longitudinally adjacent its side edge and means for applying pressure to crack off the scored edge comprising a roller lying beneath the glass adjacent the line of scoring, and a second roller located above the glass outward from said first roller and arranged to exert pressure downwardly upon the edge of the sheet, said second roller being adjustable vertically in order to regulate the pressure tending to crack off the edge of the sheet, said rollers being located in the path of movement of the scored sheet.

In testimony whereof, I have hereunto subscribed my name this 12th day of May, 1927.

WILLIAM OWEN.